US012717572B2

(12) United States Patent
Medved et al.

(10) Patent No.: US 12,717,572 B2
(45) Date of Patent: Aug. 25, 2026

(54) OVER THE AIR (OTA) SOFTWARE UPDATE FOR OUTDOOR POWER EQUIPMENT

(71) Applicant: MTD PRODUCTS INC, Valley City, OH (US)

(72) Inventors: Michael Medved, Olmsted Township, OH (US); Christopher Churavy, Lakewood, OH (US)

(73) Assignee: MTD Products Inc, Valley City, OH (US)

(*) Notice: Subject to any disclaimer, the term of this patent is extended or adjusted under 35 U.S.C. 154(b) by 235 days.

(21) Appl. No.: 18/351,920

(22) Filed: Jul. 13, 2023

(65) Prior Publication Data

US 2024/0028325 A1 Jan. 25, 2024

Related U.S. Application Data

(60) Provisional application No. 63/390,818, filed on Jul. 20, 2022.

(51) Int. Cl.
*G06F 8/656* (2018.01)
*G06F 8/654* (2018.01)

(52) U.S. Cl.
CPC .............. *G06F 8/656* (2018.02); *G06F 8/654* (2018.02)

(58) Field of Classification Search
CPC ............. G06F 8/656; G06F 8/654; G06F 8/65
See application file for complete search history.

(56) References Cited

U.S. PATENT DOCUMENTS

| | | | | |
|---|---|---|---|---|
| 10,834,207 B2 * | 11/2020 | Acharya | ................. | H04L 9/006 |
| 2009/0064127 A1 * | 3/2009 | Schneider | ................. | G06F 8/65 717/170 |
| 2014/0096121 A1 * | 4/2014 | Joshi | ......................... | G06F 8/65 717/170 |
| 2014/0173588 A1 * | 6/2014 | Ko | .......................... | G06F 8/658 717/173 |
| 2015/0331688 A1 * | 11/2015 | Shimizu | .................. | G06F 8/654 717/170 |
| 2016/0364225 A1 * | 12/2016 | Moeller | .................. | H04L 67/34 |
| 2017/0127457 A1 * | 5/2017 | Kwon | ................... | H04L 63/101 |
| 2018/0018160 A1 * | 1/2018 | Teraoka | .................... | G06F 8/65 |
| 2021/0058471 A1 * | 2/2021 | Acharya | ................... | G06F 8/65 |
| 2024/0070282 A1 * | 2/2024 | Lim | ...................... | H04L 9/0816 |

* cited by examiner

*Primary Examiner* — Wei Y Mui
*Assistant Examiner* — Brahim Bourzik
(74) *Attorney, Agent, or Firm* — Wegman Hessler

(57) ABSTRACT

Systems and methods that facilitate update of software for outdoor power equipment, including over-the-air (OTA) update, are discussed. One example embodiment is a method of facilitating update of software for an outdoor power equipment, comprising: transmitting associated version information for each microcontroller unit (MCU) of a set of MCUs of the outdoor power equipment; receiving a first request to enter a system update state; initiating the system update state in response to the first request; receiving an update binary for one or more MCUs of the set of MCUs; verifying the integrity of the update binary; receiving a second request to begin update of the one or more MCUs based on the update binary; and updating the one or more MCUs with the update binary based on the received second request.

16 Claims, 6 Drawing Sheets

OVER THE AIR (OTA) SOFTWARE UPDATE FOR OUTDOOR POWER EQUIPMENT

CROSS-REFERENCE TO RELATED APPLICATION

This application claims the benefit of U.S. Provisional Patent Application No. 63/390,818, filed Jul. 20, 2022, which is hereby incorporated by reference within the presented disclosure in its entireties and for all purposes.

FIELD OF DISCLOSURE

The disclosed subject matter pertains to apparatuses and methods for updating software for power equipment, for example, techniques for facilitate over-the-air (OTA) software update of microcontroller units (MCUs) of outdoor power equipment.

BACKGROUND

Manufacturers of power equipment for outdoor maintenance applications offer many types of machines for general maintenance and mowing applications. Generally, these machines can have a variety of forms depending on application, from general urban or suburban lawn maintenance, rural farm and field maintenance, to specialty applications. Even specialty applications can vary significantly, from sporting events requiring moderately precise turf, such as soccer fields or baseball outfields, to events requiring very high-precision surfaces such as golf course greens, tennis courts and the like.

Software update of existing outdoor power equipment is accomplished by separately connecting to each component that has software to update its software. In some scenarios, the component(s) may have to be disassembled or removed from the vehicle. Additionally, local update of such software requires technicians trained for such software updates to be available at a range of locations to accomplish updates on-site with the outdoor power equipment. In some situations, specialized equipment may also be required.

BRIEF SUMMARY

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

A first example embodiment is a method of facilitating update of software for an outdoor power equipment, comprising: transmitting associated version information for each microcontroller unit (MCU) of a set of MCUs of the outdoor power equipment; receiving a first request to enter a system update state; initiating the system update state in response to the first request; receiving an update binary for one or more MCUs of the set of MCUs; verifying the integrity of the update binary; receiving a second request to begin update of the one or more MCUs based on the update binary; and updating the one or more MCUs with the update binary based on the received second request.

A second example embodiment is a method of facilitating update of software for an outdoor power equipment, comprising: receiving associated version information for each microcontroller unit (MCU) of a set of MCUs of the outdoor power equipment; determining one or more MCUs of the set of MCUs to update; transmitting a first request for the outdoor power equipment to enter a system update state; transmitting an update binary for the one or more MCUs of the set of MCUs; and transmitting a second request to begin update of the one or more MCUs based on the update binary.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

Figure 1:
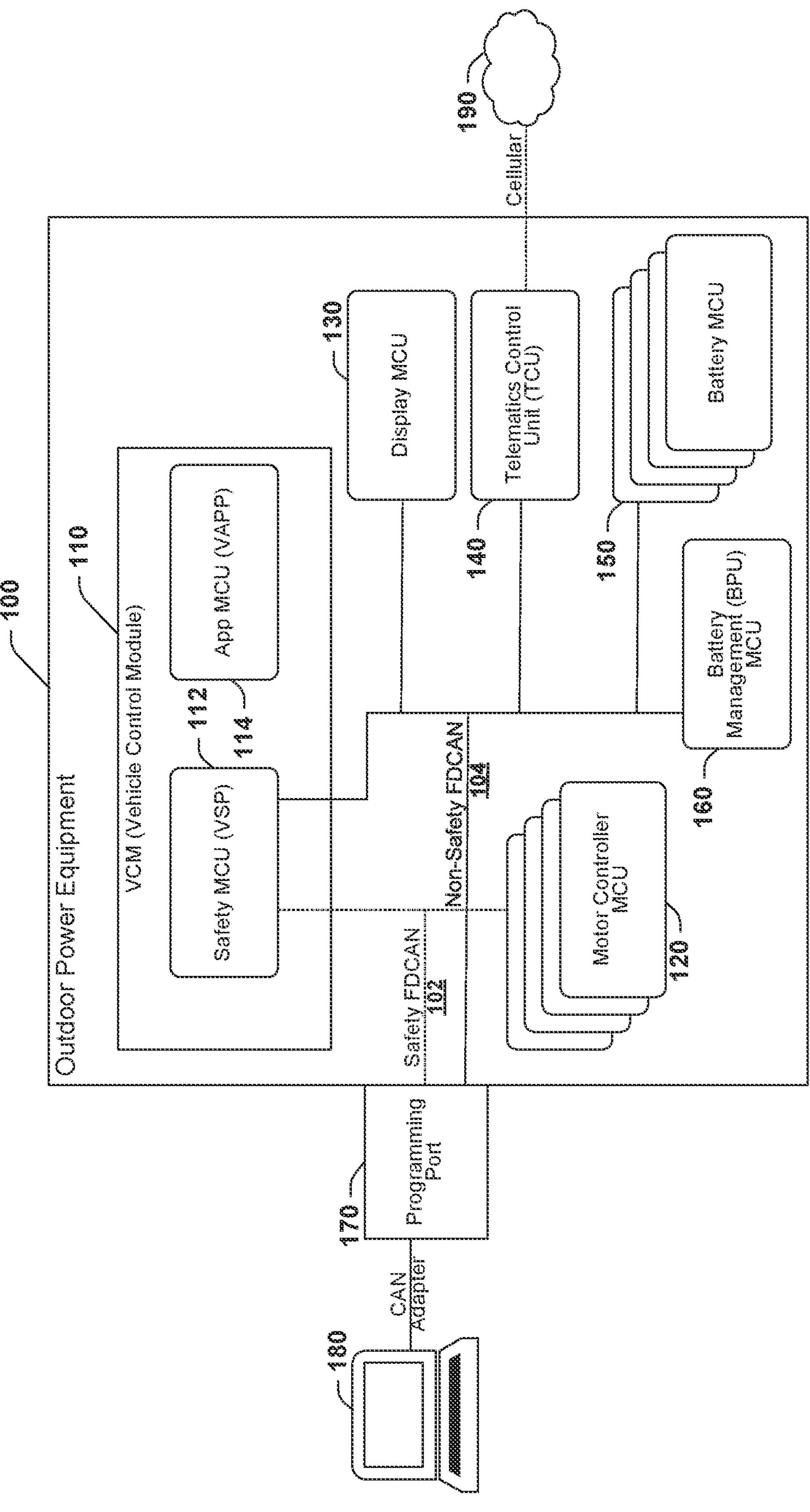
FIG. 1 illustrates a diagram showing an example FDCAN (Flexible Data-Rate Controller Area Network) control system for an outdoor power equipment, in connection with various aspects discussed herein.

It should be noted that the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments, except where clear from context that same reference numbers refer to disparate features. Accordingly, the drawings and description are to be regarded as illustrative in nature and not as restrictive.

While embodiments of the disclosure pertaining to providing user feedback and enhanced drivability in drive-by-wire systems for power equipment machines are described herein, it should be understood that the disclosed machines, electronic and computing devices and methods are not so limited and modifications may be made without departing from the scope of the present disclosure. The scope of the systems, methods, and electronic and computing devices for providing user feedback and enhanced drivability in drive-by-wire systems are defined by the appended claims, and all devices, processes, and methods that come within the meaning of the claims, either literally or by equivalence, are intended to be embraced therein.

DETAILED DESCRIPTION

The following terms are used throughout the description, the definitions of which are provided herein to assist in understanding various aspects of the subject disclosure.

As used in this application, the terms "outdoor power equipment", "outdoor power equipment machine", "power equipment", "maintenance machine" and "power equipment machine" are used interchangeably and are intended to refer to any of manually operated, robotic, partially robotic ride-on, walk-behind, sulky equipped, autonomous, semi-autonomous (e.g., user-assisted automation), remote control, or multi-function variants of any of the following: powered carts and wheel barrows, lawn mowers, lawn and garden tractors, lawn trimmers, lawn edgers, lawn and leaf blowers or sweepers, hedge trimmers, pruners, loppers, chainsaws, rakes, pole saws, tillers, cultivators, aerators, log splitters, post hole diggers, trenchers, stump grinders, snow throwers (or any other snow or ice cleaning or clearing implements), lawn, wood and leaf shredders and chippers, lawn and/or leaf vacuums, pressure washers, lawn equipment, garden equipment, driveway sprayers and spreaders, and sports field marking equipment.

In various embodiments, systems and methods are discussed that can facilitate over-the-air (OTA) software update for outdoor power equipment. Various embodiments can facilitate updates to software and/or firmware for nodes in a system employing a VCM VCM (Vehicle Control Module) (e.g., example VCM 200 discussed in greater detail below), such as various outdoor power equipment (e.g., lawn maintenance equipment, etc.).

Various embodiments can employ a single transfer and update function enables updating of all components with a single bundle file over a cellular network or other wireless connection. Without a remote update feature as disclosed herein, a user would have to connect to each component that has software separately in order to update software. In some cases, the component would have to be disassembled or removed from the vehicle. Without remote and wireless update capability, many technicians would need to be trained for software updates as opposed to a small group of trained technicians that can remotely update all vehicles.

Various embodiments can comprise, be comprised within, or be performed by an outdoor power equipment with built-in wireless (e.g., cellular, WiFi, etc.) technology, which has a digital connection to all components that have software. Between a Telematics Control Unit (TCU) and a Vehicle Control Module (VCM), updating of each software component can be performed remotely until all software components are updated.

Referring to FIG. 1, illustrated is a diagram showing an example FDCAN (Flexible Data-Rate Controller Area Network) control system 100 for an outdoor power equipment, in connection with various aspects discussed herein. System 100 comprises a set of MCUs (Microcontroller Units) 112-160 that each perform a function and are networked together via FIG. 1 shows examples of various of an example outdoor power equipment (e.g., a mower, etc.), along with the safety FDCAN 102 and non-safety FDCAN 104 that these can be connected and communicate via. System 100 is provided as one example of MCUs that can comprise a control system for an outdoor power equipment, although various embodiments can omit one or more illustrated MCUs and/or comprise one or more alternative MCUs.

VCM (Vehicle Control Module) 110 can comprise a Safety MCU (e.g., a VSP (VCM Safety Processor)) 112 and an Application (App) MCU (e.g., a VAPP (Vehicle Application Processor)) 114, which can communicate with each other via a SPI (Serial Peripheral Interface). In other embodiments, VCM 110 can comprise additional or alternative elements.

Safety MCU 112 can be networked via Safety FDCAN 102 to Motor Controller MCU(s) 120 and programming port 170. Non-safety FDCAN 104 can network together Safety MCU 112, Display MCU 130, TCU 140, Battery MCU(s) 150, and Battery Management MCU (e.g., a BPU (Battery Processing Unit)) 160.

System 100 can connect via programming port 170 to a computer 180 over a CAN adapter (e.g., for wired updates, etc.) and/or via TCU 140 to a cloud application 190 via a cellular network, WiFi, etc. (e.g., for wireless (OTA) updates, etc.).

In one example embodiment of system 100, all the nodes on the FDCAN network (102 and 104) are STM32 parts and come with an FDCAN bootloader programmed into their system memory. The VAPP 114 is the exception and is a Nordic NRF52840 MCU. The VAPP 11 is also the only node not on any CAN bus (102 or 104).

System 100 and its components can have various characteristics to one or more embodiments discussed herein. MCUs (e.g., 112-160) can be updateable both as part of the assembly they are in as well as in the integrated end unit. MCUs can come from the factory either with a version of production software or a test image which supports this system update concept. MCUs can utilize off the shelf bootloaders from the vendors when possible, for example, the STM32 FDCAN bootloader. If one or more of the MCUs does not support the relevant bootloader protocol (e.g., STM32 FDCAN) natively, the MCU(s) can have this support added. Additionally, all motor controllers 120 and batteries 150 can use a resistor-based ID system so they can be uniquely identifiable on the CAN bus (102 or 104). Finally, the VSP 112 can have bus bridging features to send messages on one CAN bus to the other (both ways, i.e., 102 to 104 and 104 to 102).

Software installation and/or update for system 100 or a similar system can occur in any of a variety of scenarios, including but not limited to those discussed below.

A first example scenario is factory software update. When assemblies (e.g., for outdoor power equipment, etc.) arrive in the factory which contain MCUs, production software can be initially updated on to them. The user can use a computer program with an FDCAN interface (e.g., computer 180, etc.) to query software versions from the MCUs and then update any nodes as appropriate.

A second example scenario is a service provider update. When a user brings a power equipment unit in for service, parts might be replaced which have older software versions installed on them, or the software on working parts may need updated. The service provider can use a computer program with an FDCAN interface to query software versions from the MCUs and then update any nodes which need updated (e.g., via a computer such as computer 180, etc.). This way, if the location of service has poor/no cellular service, or the unit being serviced does not have a connectivity device (e.g., TCU 140 and associated hardware, etc.), or the connectivity device itself is broken, the unit's software can be checked and updated.

A third example scenario is an end user update. In power equipment units with a connectivity module (e.g., TCU 140 and associated hardware, etc.), when software updates are available the system can notify the user through any of a variety of methods (e.g., via the display on the unit, through mobile application software (e.g., an app) on a phone of the user, via text message, etc.). At a convenient time, the user can then park the unit and go through the on-board update process over cellular (or WiFi, etc.). The App and Safety MCUs 112 and 114 of the VCM 110 can handle the downloading (via TCU 140), verification, and programming of the images to the correct MCU. The remote application can query the versions and determine which nodes are to be updated. In some embodiments, updates can be downloaded automatically when the power equipment is in the correct state (e.g., not being operated, wireless connection, sufficient charge, etc.), for example, based on prior user approval or without requiring approval, etc.

The Connectivity module (e.g., MCU 140) and the VCM 110 can both have access to power when the key is not in the system for the purpose of downloading system updates while the unit is charging, or has high enough SOC. This way, the unit can have downloaded and verified the binary packages and can have them waiting on the unit when the operator next sits down and chooses to update the system.

The VCM 110 can be the storage area for the binaries. The system can leave other nodes (Battery, Motor Controllers) unpowered while the unit is in an off state for update purposes, and wait for operator presence before powering those nodes.

A fourth example scenario is an engineering update. Engineering can program the unit many times during development, when it is not convenient to attach debugging tools. The user can use a computer program with an FDCAN interface (e.g., computer 180, etc.) to query software versions from the MCUs and then update any nodes to be updated.

As discussed above and as shown in FIG. 1, there are two different potential ways to update MCUs on system 100 and similar systems: FDCAN update and wireless (e.g., cellular, WiFi, etc.) update.

The first update technique is the FDCAN update (e.g., via wired connection). The FDCAN system update design can be based on the STM32 FDCAN bootloader, which can come on the MCUs being used in our system. The bootloader has the following characteristics: (1) Only one node on the bus can be programmed at a time. All other nodes must ignore system update bus traffic if not in their own bootloader. Even multiple nodes of the same type (motor controller, battery) cannot be programmed at the same time. (2) It requires the application software on the MCU to trigger the jump into the bootloader. In system 100 and similar systems, the programming utility can send a message on a reserved CAN ID which tells the system to go into an update state and indicates the node to be programmed. That node can then jump to its bootloader while all others do not. (3) STM32 G0 MCUs (e.g., which can be employed as MCUs 112-160 in various embodiments, etc.) will remain in the bootloader if they detect the flash is not programmed (e.g., as discussed in section 3.3.2 of the STM2G0x1 Reference Manual, available at https://www.st.com/resource/en/reference_manual/dm00371828-stm32g0x1-advanced-arm-based-32-bit-mcus-stmicroelectronics.pdf, the entirety of which is incorporated by reference herein). The bootloader examines the lowest address of FLASH for this check.

The client software can connect to both CAN busses, query each node's version information, and then update the nodes one at a time until they are all at the appropriate software version. The updating computer can directly update each node itself by speaking the ST FDCAN bootloader protocol. All other nodes can be held in an inactive state while waiting for updates to complete. The Display and VAPP MCUs 120 and 114 can have additional commands beyond the ST FDCAN bootloader protocol to support specific update targets for those MCUs.

Unplugging or disturbing the update as it occurs should be avoided because the ST bootloader is directly writing the new software directly into FLASH on the MCU. Partial updates can render the system unusable, but not bricked. In such scenarios, the client software can issue an erase command to the bootloader, and then program from the highest address to the lowest so that if the process is interrupted, the bootloader will see FLASH is erased and stay in the bootloader. This does not require complete chip erase, but will involve the first page, and any other that need updated.

All nodes can ignore FDCAN system update commands in their application software, which can be facilitated hardware filtering in some embodiments.

The second update technique is the wireless update (e.g., via cellular, WiFi, etc. connection). Wireless update adds a layer around the STM32 FDCAN bootloader by using the Connectivity and VCM MCUs 112, 114, and 140 to download images and then utilize the ST bootloader to program nodes from the VCM 110. This design can be flexible, as the Connectivity module (MCU 140, etc.) is very likely to change across projects and needs to scale to higher and lower costs and volumes, depending on the specific embodiment (e.g., the specific outdoor power equipment in which system 100 or a similar system is employed, etc.).

Wireless update can proceed as follows. (1) The cloud application 190 can gather the versions from the various MCUs (e.g., via a CAN configuration/diagnostic protocol) and can determines which applications to update. (2) The cloud application can request the system go to a system update state (e.g., and the system can go to the system update state). (3) The cloud application can begin download to VCM Safety MCU 112 external storage of a single application. Upon download completion, VCM 110 can verify integrity of the received binary. This binary can be used to program multiple nodes of the same type (e.g., motor controller MCUs 120, battery MCUs 150, etc.). (4) Cloud application 190 can request VCM 110 begin update of node(s). VCM MCU 112 can take over and begin the FDCAN ST bootloader sequence to the node being updated. To the node being updated, wireless update is just like the normal FDCAN update sequence discussed above.

In either the first or the second update technique, a quiet mode can be employed to address software and/or firmware updates associated with systems that included legacy components, such as CAN 2.0 (e.g., not FDCAN, etc.) nodes, etc. When an FDCAN style update is initiated, nodes that operate using CAN 2.0 (Classic CAN) can enter a mode described in the CANFD specification as 'bus monitoring mode'. In this mode, a node will not transmit on the bus. Initiating bus monitoring mode can avoid the node entering into an error state and taking down the whole bus due to incompatible CANFD messages.

Updating the VSP 112 with FDCAN is exactly the same as all other nodes. However, because the VSP 112 is storing the intermediate binary for loading onto other MCUs, it has a different procedure when updating over cellular, etc. When on cellular (etc.), the VSP 112 can store the binary in external FLASH (like normal). Then, to update itself, VSP 112 can load a small bootloader that is already on the device into its own RAM. This bootloader can then transfers the new binary from the external flash to internal flash, and can then return to normal execution.

The Display MCU 130 has two types of software to update: (1) its own internal program code which exists on MCU internal FLASH, and (2) display image assets, which exist on an external FLASH. The first piece of software is updated exactly the same as every other MCU in both CAN and Cellular (etc.) approaches, via the ST bootloader. The image asset external FLASH is both not supported by the onboard ST bootloader and also is much larger, and thus requires special handling.

The software image loaded in the Display internal MCU FLASH will include code which implements the ST bootloader protocol (plus enhancements) to program updates to the external FLASH, but is not actually running the ST bootloader itself.

This allows CAN update to be very similar to how every other MCU update works, but with a few enhancements (as appropriate). For OTA, because the images have the potential to be really large, the VCM can omit performing a buffer and transmit per usual, and can instead stream directly to the Display MCU. This means these updates will be particularly vulnerable to signal loss situations. Accordingly, in these updates, the user can be informed to not power down or disconnect from cellular, etc. The Display MCU can receive information up front about nature of the update, and can maintain status as the update proceeds so that it can be interrupted and restarted.

The VAPP 114 is the only MCU not directly connected to the CAN bus, so it can employ a two stage update procedure through the VSP 112. For FDCAN update, the VSP 112 can act as forwarder to the VAPP 114, which can contain a bootloader that supports the ST protocol over serial. For OTA, the VSP 102 can store the binary image on its external FLASH per usual, and then update the VAPP 114 using the same serial bootloader.

In various embodiments, to save data and/or time, the programming software in either or both of the FDCAN local update scenario (e.g., at computer 180) or the OTA remote scenario (e.g., at cloud application 190) can have binaries for all versions. When a new version is requested, a binary delta can be computed between the images of the two versions, and in some scenarios, only those pages/sectors can be loaded. Alternatively, if a large enough percentage has changed, the entire image of the new version can be sent.

Figure 2:
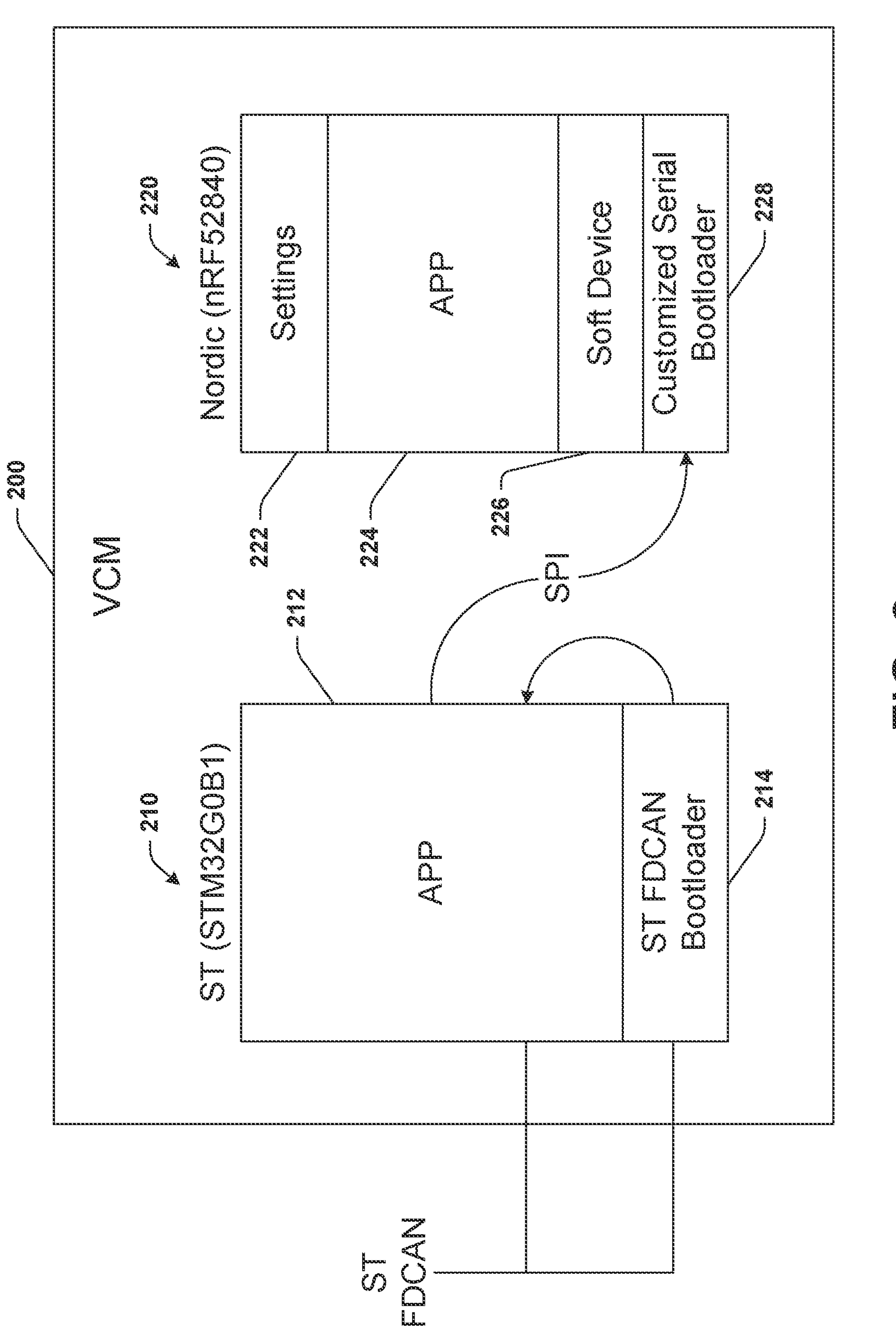
FIG. 2 illustrates a diagram of a premium Vehicle Control Module (VCM) that can be employed as VCM in the system of FIG. 1 or a similar system, in connection with various aspects discussed herein.

Referring to FIG. 2, illustrated is a diagram of a premium VCM 200 that can be employed as VCM 110 in system 100 or a similar system, in connection with various aspects discussed herein. Premium VCM 200 comprises a VSP 210 (e.g., an STM32G0B1) that can be employed as VSP 112 in system 100 or a similar system and a VAPP 220 (e.g., a Nordic nRF52840) that can be employed as VAPP 114 in system 100 or a similar system.

VSP 210 can comprise the VSP application (App 212) and a FDCAN (e.g., ST FDCAN) bootloader 214. VAPP 220 can comprise settings 222, VAPP application (App 224), soft device 226, and a customized serial bootloader 228. The ST processor application 212 can be updated using the built in FDCAN bootloader 214 based on data received via the ST FDCAN (e.g., 102 or 104, etc.), which can be via either the FDCAN update or wireless/cellular update discussed herein.

Application 212 on the ST processor 210 can support programming processor 220 via SPI. The ST app 212 can convert the FDCAN bootloader commands to SPI messages and pass them through to the customized (e.g., Nordic) serial bootloader 228. The custom serial bootloader 228 can convert the FDCAN bootloader protocol via SPI messages to local (e.g., Nordic) SDK calls for writing to appropriate flash locations (e.g., in app 224, etc.).

In various aspects, new system protocol buffer messaging can be implemented and supported on both processors 210 and 220 as a means for entering and exiting the update mode.

Figure 3:
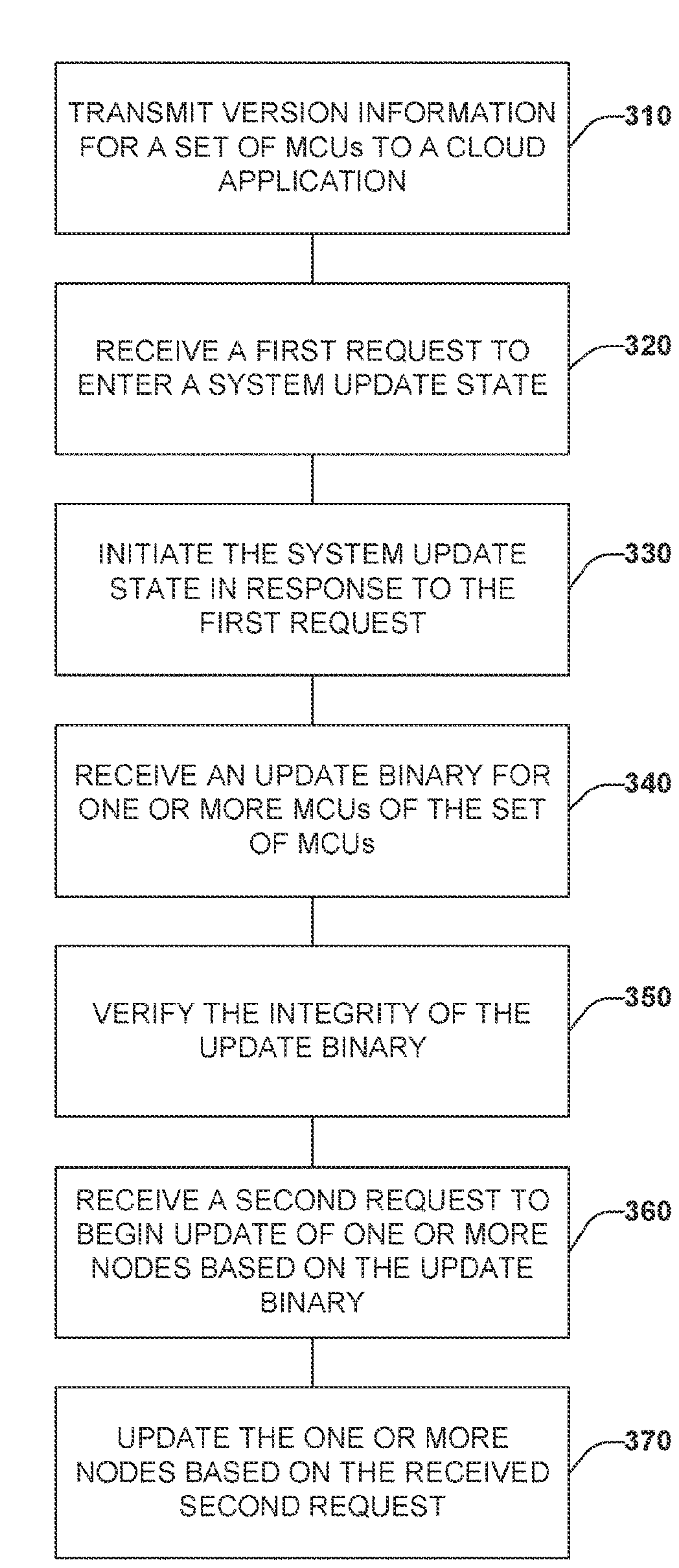
FIG. 3 illustrates a flow diagram of an example method or process employable at an outdoor power equipment that facilitates over the air (OTA) software update of one or more microcontroller units (MCUs) of the outdoor power equipment, according to various aspects discussed herein.
Figure 4:
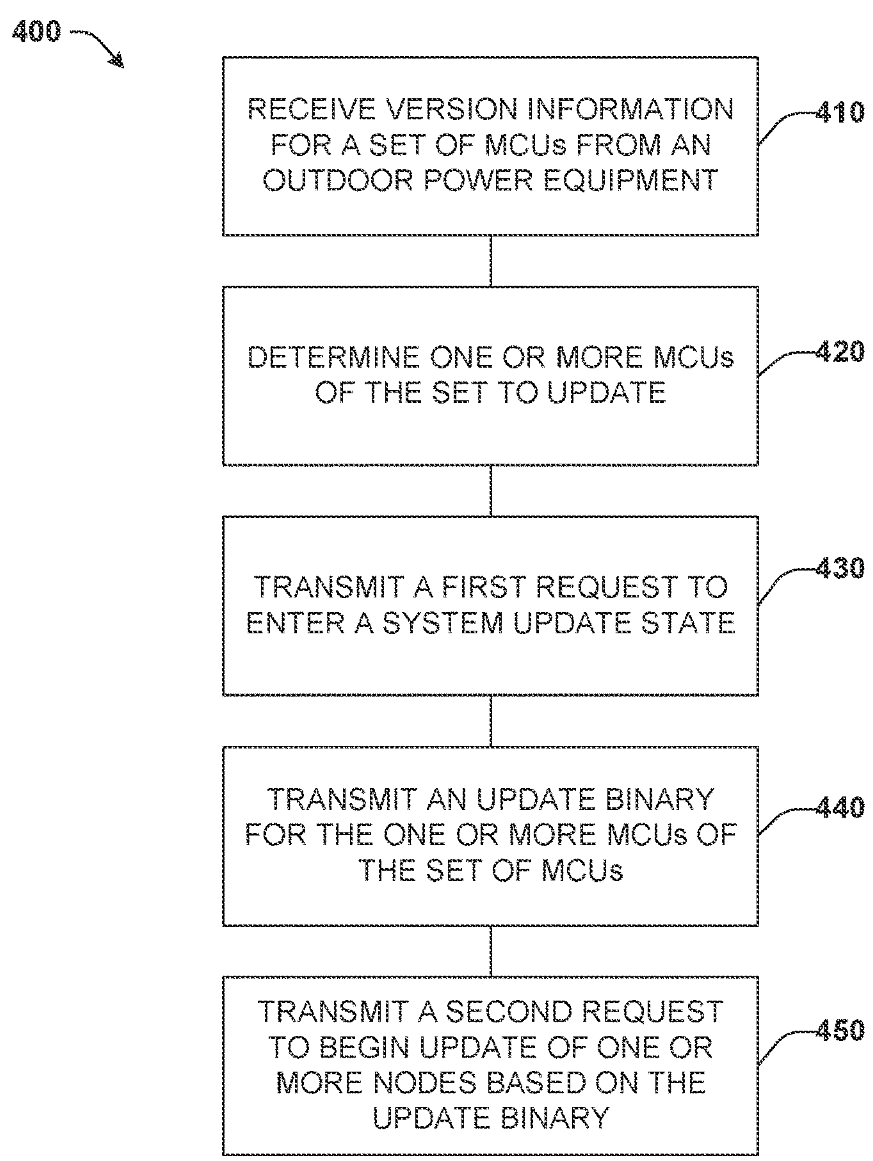
FIG. 4 illustrates a flow diagram of an example method or process employable by a cloud application that facilitates over the air (OTA) software update of one or more microcontroller units (MCUs) of an outdoor power equipment, according to various aspects discussed herein.

In view of the exemplary diagrams described supra, process methods that can be implemented in accordance with the disclosed subject matter will be better appreciated with reference to the flow charts of FIGS. 3 and 4. While for purposes of simplicity of explanation, the methods of FIGS. 3 and 4 are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein, and in some embodiments additional steps known in the art or reasonably conveyed to one of ordinary skill in the art by way of the context provided herein are also considered within the scope of the present disclosure. Moreover, some steps illustrated as part of one process can be implemented for another process where suitable; other steps of one or more processes can be added or substituted in other processes disclosed herein within the scope of the present disclosure. Additionally, it should be further appreciated that the methods disclosed throughout this specification are capable of being stored on an article of manufacture to facilitate transporting and transferring such methodologies to an electronic device. The term article of manufacture, as used, is intended to encompass a computer program accessible from any computer-readable device, device in conjunction with a carrier, or storage medium.

Referring to FIG. 3, illustrated is a flow diagram of an example method or process 300 employable at an outdoor power equipment that facilitates over the air (OTA) software update of one or more microcontroller units (MCUs) of the outdoor power equipment, according to various aspects discussed herein. In other aspects, a machine readable (e.g., computer-readable) medium can store instructions associated with method 300 that, when executed, can cause an outdoor power equipment to perform the acts of method 300.

At 310, method 300 can comprise transmitting version information for a set of MCUs (e.g., MCUs 112-160 of system 100, MCUs of a similar system, etc.) of the outdoor power equipment to a cloud application (e.g., cloud application 190, etc.). In various embodiments, version information can be provided periodically to check for updates, can be user initiated, can be provided in response to a request from the cloud application, can be provided in response to a notification that one or more updates are available, etc.

At 320, method 300 can comprise receiving a first request from the cloud application, wherein the first request can be a request to enter a system update state.

At 330, method 300 can comprise initiating or entering the system update state in response to the first request.

At 340, method 300 can comprise receiving an update binary for one or more MCUs of the set of MCUs. A single update binary can be received at 340, and depending on which type of MCU it is for and the composition of the system at the outdoor power equipment, either one or more MCUs can be updated with that update binary. In various scenarios, the received update binary can include only pages/segments changed by an update to a new version, or can include the entire new version.

At 350, method 300 can comprise verifying the integrity of the received update binary via a VCM of the outdoor power equipment. In various embodiments, the verification can be internal to the VCM, or TCU, or could be external by either node computing a Cyclic Redundancy Check (CRC) and sending to the client for verification.

At 360, method 300 can comprise receiving a second request from the cloud application, wherein the second request can be a request to update one or more nodes (e.g., all relevant nodes, etc.) based on the received update binary.

At 370, the one or more nodes can be updated based on the received binary. As discussed above, for most nodes, the update sequence can be identical to an FDCAN wired update from the perspective of the node(s) being updated, although alternative update techniques can be applied for certain nodes (e.g., VSP, VAPP, etc.).

Depending on the number of nodes for which new versions are available, method 300 or portions thereof (e.g., 320-370, or 340-370) can be repeated for one or more additional update binaries and their relevant nodes until all MCUs are updated to the most recent available software versions.

Referring to FIG. 4, illustrated is a flow diagram of an example method or process 400 employable by a cloud application that facilitates over the air (OTA) software update of one or more microcontroller units (MCUs) of an outdoor power equipment, according to various aspects discussed herein. In other aspects, a machine readable (e.g., computer-readable) medium can store instructions associated with method 400 that, when executed, can cause a cloud application to perform the acts of method 400.

At 410, method 400 can comprise receiving version information for a set of MCUs (e.g., MCUs 112-160 of system 100, MCUs of a similar system, etc.) of an outdoor power equipment at a cloud application (e.g., cloud application 190, etc.). In various embodiments, version information can be provided periodically to check for updates, can be initiated by a user of the power equipment, can be provided in response to a request from the cloud application, etc.

At 420, method 400 can comprise determining one or more MCUs of the set to update. At 420, a single distinct type of MCU can be selected (which may correspond to one or more than one MCU of the set, e.g., motor controller MCU(s) 120, display MCU 130, etc.) for update, and portions of method 400 (e.g., 420-450) can be repeated if more than one type of MCU can be updated. Alternatively, if no MCUs of the set of MCUs can be updated, method 400 can end instead of determining MCU(s) to update.

At 430, method 400 can comprise transmitting a first request to the outdoor power equipment, wherein the first request can be a request to enter a system update state.

At 440, method 400 can comprise transmitting an update binary for one or more MCUs of the set of MCUs to the outdoor power equipment. A single update binary can be transmitted at 440 and depending on which type of MCU it is for and the composition of the system at the outdoor power equipment, either one or more MCUs can be updated with that update binary. In various scenarios, the transmitted update binary can include only pages/segments changed by an update to a new version or can include the entire new version.

At 450, method 400 can comprise transmitting a second request to the outdoor power equipment, wherein the second request can be a request to update one or more nodes (e.g., all relevant nodes, etc.) based on the transmitted update binary.

Depending on the number of nodes for which new versions are available, method 400 or portions thereof (e.g., 420-450) can be repeated for one or more additional update binaries and their relevant nodes until all MCUs are updated to the most recent available software versions.

Figure 5:
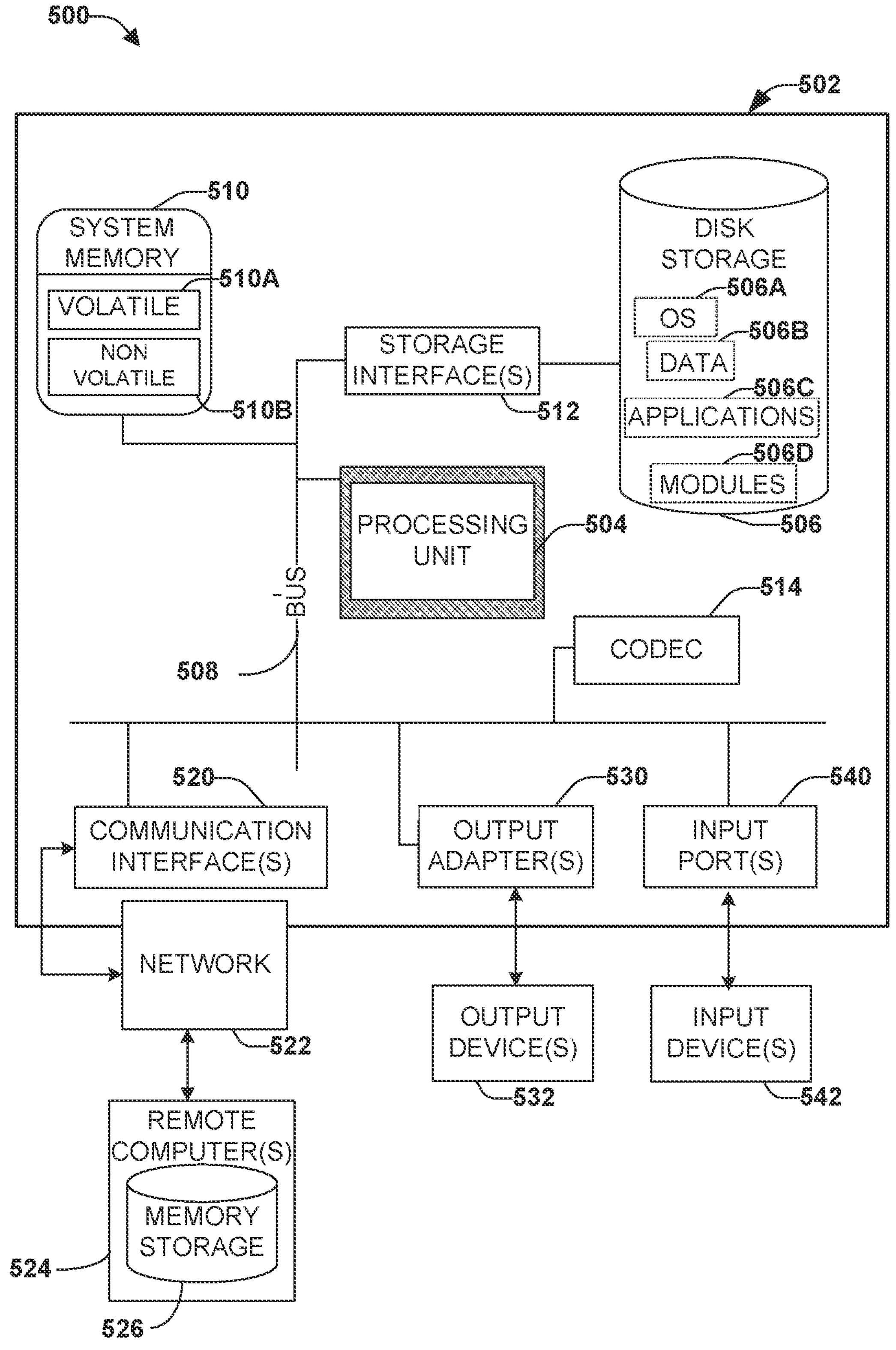
FIG. 5 depicts a diagram of an example computing environment for electronic and data management and computer control for a power equipment machine, in an embodiment.

In connection with FIG. 5, the systems and processes described herein can be embodied within hardware, such as a single integrated circuit (IC) chip, multiple ICs, an application specific integrated circuit (ASIC), or the like. A suitable operating environment 500 for implementing various aspects of the claimed subject matter includes a computer 502. In various embodiments, a control system (e.g., system 100, etc.) of a power equipment machine can be embodied in part by computer 502, or an analogous computing device known in the art, subsequently developed, or made known to one of ordinary skill in the art by way of the context provided herein.

The computer 502 includes a processing unit 504, a system memory 510, a codec 514, and a system bus 508. The system bus 508 couples system components including, but not limited to, the system memory 510 to the processing unit 504. The processing unit 504 can be any of various available processors. Dual microprocessors and other multiprocessor architectures also can be employed as the processing unit 504.

The system bus 508 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 510 can include volatile memory 510A, non-volatile memory 510B, or both. Functions of a control unit (among other control units: 150, etc., depicted herein) described in the present specification can be programmed to system memory 510, in various embodiments. The basic input/output system (BIOS), containing the basic routines to transfer information between elements within the computer 502, such as during start-up, is stored in non-volatile memory 510B. In addition, according to present innovations, codec 514 may include at least one of an encoder or decoder, wherein the at least one of an encoder or decoder may consist of hardware, software, or a combination of hardware and software. Although, codec 514 is depicted as a separate component, codec 514 may be contained within non-volatile memory 510B. By way of illustration, and not limitation, non-volatile memory 510B can include read only memory (ROM), programmable ROM (PROM), electrically programmable ROM (EPROM), electrically erasable programmable ROM (EEPROM), or Flash memory. Non-volatile memory 510B can be embedded memory (e.g., physically integrated with computer 502 or a mainboard thereof), or removable memory. Examples of suitable removable memory can include a secure digital (SD) card, a compact Flash (CF) card, a universal serial bus (USB) memory stick, or the like. Volatile memory 510A includes random access memory (RAM), which can serve as operational system memory for applications executed by processing unit 504. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM), and so forth.

Computer 502 may also include removable/non-removable, volatile/non-volatile computer storage medium. FIG. 5 illustrates, for example, disk storage 506. Disk storage 506 includes, but is not limited to, devices such as a magnetic disk drive, solid state disk (SSD) floppy disk drive, tape drive, Flash memory card, memory stick, or the like. In addition, disk storage 506 can include storage medium separately or in combination with other storage medium including, but not limited to, an optical disk drive such as a compact disk ROM device (CD-ROM) or derivative technology (e.g., CD-R Drive, CD-RW Drive, DVD-ROM, and so forth). To facilitate connection of the disk storage 506 to the system bus 508, a removable or non-removable interface is typically used, such as interface 512. In one or more embodiments, disk storage 506 can be limited to solid state non-volatile storage memory, providing motion and vibration resistance for a control unit (e.g., control unit 112, among others) operable in conjunction with a power equipment machine (e.g., power equipment machine 102, etc.).

It is to be appreciated that FIG. 5 describes software that can program computer 502 to facilitate software update of a power equipment machine (e.g., a power equipment machine comprising system 100, and others) within operating environment 500. Such software includes an operating system 506A. Operating system 506A, which can be stored on disk storage 506, acts to control and allocate resources of the computer 502. Applications 506C take advantage of the management of resources by operating system 506A through program modules 506D, and program data 506B, such as the boot/shutdown transaction table and the like, stored either in system memory 510 or on disk storage 506. It is to be appreciated that the claimed subject matter can be implemented with various operating systems or combinations of operating systems.

Input device(s) 542 connects to the processing unit 504 and facilitates user interaction with operating environment 500 through the system bus 508 via interface port(s) 530. Input port(s) 540 can include, for example, a serial port, a parallel port, a game port, a universal serial bus (USB), among others. Output device(s) 532 use some of the same type of ports as input device(s) 542. Thus, for example, a USB port may be used to provide input to computer 502 and to output information from computer 502 to an output device 532. Output adapter 530 is provided to illustrate that there are some output devices, such as graphic display, speakers, and printers, among other output devices, which require special adapters. The output adapter 530 can include, by way of illustration and not limitation, video and sound cards that provide a means of connection between the output device 532 and the system bus 508. It should be noted that other devices or systems of devices provide both input and output capabilities such as remote computer(s) 524 and memory storage 526.

Computer 502 can operate in conjunction with one or more electronic devices described herein. For instance, computer 502 can be embodied within an outdoor power equipment employing system 100 or a similar system and can facilitate update of software for one or more MCUs of that system, as described herein. Alternatively, computer 502 can implement at least a portion of a cloud application 190 and can facilitate update of software for one or more MCUs of an outdoor power equipment, as described herein.

Communication connection(s) 520 refers to the hardware/software employed to connect the network interface 522 to the system bus 508. While communication connection 520 is shown for illustrative clarity inside computer 502, it can also be external to computer 502. The hardware/software necessary for connection to the network interface 522 includes, for exemplary purposes only, internal and external technologies such as, modems including regular telephone grade modems, cable modems and DSL modems, ISDN adapters, and wired and wireless Ethernet cards, hubs, and routers.

Figure 6:
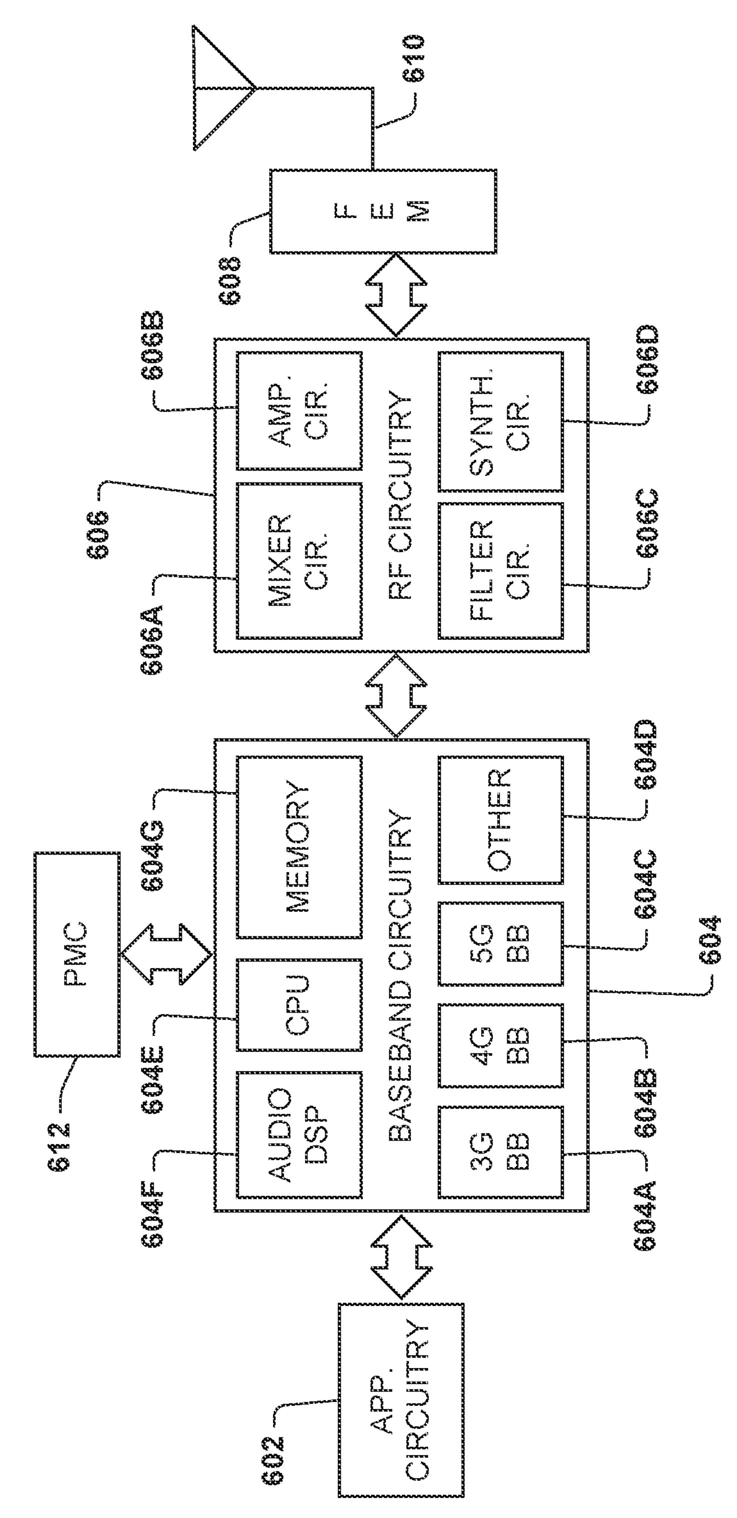
FIG. 6 is a diagram illustrating example components of a communication device that can be employed in accordance with various aspects discussed herein.

Referring to FIG. 6, illustrated are example components of a communication device 600 in accordance with some aspects. In some aspects, the device 600 can include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 can be included in a User Equipment (UE) (e.g., an Internet of Things (IoT) UE in an outdoor power equipment, etc.) or a Radio Access Network (RAN) node (e.g., to facilitate communication with a cloud application 190, etc.). In some aspects, the device 600 can include fewer elements (e.g., a RAN node may not utilize application circuitry 602, and instead include a processor/controller to process IP data received from a Core Network (CN) such as a Fifth Generation Core Network (5GC) or an Evolved Packet Core (EPC), an IoT UE can omit audio Digital Signal Processor 604F, etc.). In some aspects, the device 600 can include additional elements such as, for example, memory/storage, display, camera, sensor, or input/output (I/O) interface. In other aspects, the components described below can be included in more than one device (e.g., said circuitries can be separately included in more than one device for Cloud-RAN (C-RAN) implementations).

The application circuitry 602 can include one or more application processors. For example, the application circuitry 602 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 600. In some aspects, processors of application circuitry 602 can process IP data packets received from an EPC.

The baseband circuitry 604 can include circuitry such as, but not limited to, one or more single-core or multi-core processors. The baseband circuitry 604 can include one or more baseband processors or control logic to process baseband signals received from a receive signal path of the RF circuitry 606 and to generate baseband signals for a transmit signal path of the RF circuitry 606. Baseband processing circuity 604 can interface with the application circuitry 602 for generation and processing of the baseband signals and for controlling operations of the RF circuitry 606. For example, in some aspects, the baseband circuitry 604 can include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) can handle various radio control functions that enable communication with one or more radio networks via the RF circuitry 606. In other aspects, some or all of the functionality of baseband processors 604A-D can be included in modules stored in the memory 604G and executed via a Central Processing Unit (CPU) 604E. The radio control functions can include, but are not limited to, signal modulation/demodulation, encoding/decoding, radio frequency shifting, etc. In some aspects, modulation/demodulation circuitry of the baseband circuitry 604 can include Fast-Fourier Transform (FFT), precoding, or constellation mapping/demapping functionality. In some aspects, encoding/decoding circuitry of the baseband circuitry 604 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 604 can include one or more audio digital signal processor(s) (DSP) 604F. The audio DSP(s) 604F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 604 and the application circuitry 602 can be implemented together such as, for example, on a system on a chip (SOC).

In some aspects, the baseband circuitry 604 can provide for communication compatible with one or more radio technologies. For example, in some aspects, the baseband circuitry 604 can support communication with a NG-RAN, an evolved universal terrestrial radio access network (EUTRAN) or other wireless metropolitan area networks (WMAN), a wireless local area network (WLAN), a wireless personal area network (WPAN), etc. Aspects in which the baseband circuitry 604 is configured to support radio communications of more than one wireless protocol can be referred to as multi-mode baseband circuitry.

RF circuitry 606 can enable communication with wireless networks using modulated electromagnetic radiation through a non-solid medium. In various aspects, the RF circuitry 606 can include switches, filters, amplifiers, etc. to facilitate the communication with the wireless network. RF circuitry 606 can include a receive signal path which can include circuitry to down-convert RF signals received from the FEM circuitry 608 and provide baseband signals to the baseband circuitry 604. RF circuitry 606 can also include a transmit signal path which can include circuitry to up-convert baseband signals provided by the baseband circuitry 604 and provide RF output signals to the FEM circuitry 608 for transmission.

In some aspects, the receive signal path of the RF circuitry 606 can include mixer circuitry 606A, amplifier circuitry 606B and filter circuitry 606C. In some aspects, the transmit signal path of the RF circuitry 606 can include filter circuitry 606C and mixer circuitry 606A. RF circuitry 606 can also include synthesizer circuitry 606D for synthesizing a frequency for use by the mixer circuitry 606A of the receive signal path and the transmit signal path. In some aspects, the mixer circuitry 606A of the receive signal path can be configured to down-convert RF signals received from the FEM circuitry 608 based on the synthesized frequency provided by synthesizer circuitry 606D. The amplifier circuitry 606B can be configured to amplify the down-converted signals and the filter circuitry 606C can be a low-pass filter (LPF) or band-pass filter (BPF) configured to remove unwanted signals from the down-converted signals to generate output baseband signals. Output baseband signals can be provided to the baseband circuitry 604 for further processing. In some aspects, the output baseband signals can be zero-frequency baseband signals, although this is not a requirement. In some aspects, mixer circuitry 606A of the receive signal path can comprise passive mixers, although the scope of the aspects is not limited in this respect.

In some aspects, the mixer circuitry 606A of the transmit signal path can be configured to up-convert input baseband signals based on the synthesized frequency provided by the synthesizer circuitry 606D to generate RF output signals for the FEM circuitry 608. The baseband signals can be provided by the baseband circuitry 604 and can be filtered by filter circuitry 606C.

In some aspects, the mixer circuitry 606A of the receive signal path and the mixer circuitry 606A of the transmit signal path can include two or more mixers and can be arranged for quadrature downconversion and upconversion, respectively. In some aspects, the mixer circuitry 606A of the receive signal path and the mixer circuitry 606A of the transmit signal path can include two or more mixers and can be arranged for image rejection (e.g., Hartley image rejection). In some aspects, the mixer circuitry 606A of the receive signal path and the mixer circuitry 606A can be arranged for direct downconversion and direct upconversion, respectively. In some aspects, the mixer circuitry 606A of the receive signal path and the mixer circuitry 606A of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 606 can include analog-to-digital converter (ADC) and digital-to-analog converter (DAC) circuitry and the baseband circuitry 604 can include a digital baseband interface to communicate with the RF circuitry 606.

In some dual-mode aspects, a separate radio IC circuitry can be provided for processing signals for each spectrum, although the scope of the aspects is not limited in this respect.

In some aspects, the synthesizer circuitry 606D can be a fractional-N synthesizer or a fractional N/N+1 synthesizer, although the scope of the aspects is not limited in this respect as other types of frequency synthesizers can be suitable. For example, synthesizer circuitry 606D can be a delta-sigma synthesizer, a frequency multiplier, or a synthesizer comprising a phase-locked loop with a frequency divider.

The synthesizer circuitry 606D can be configured to synthesize an output frequency for use by the mixer circuitry 606A of the RF circuitry 606 based on a frequency input and a divider control input. In some aspects, the synthesizer circuitry 606D can be a fractional N/N+1 synthesizer.

In some aspects, frequency input can be provided by a voltage controlled oscillator (VCO), although that is not a requirement. Divider control input can be provided by either the baseband circuitry 604 or the applications processor 602 depending on the desired output frequency. In some aspects, a divider control input (e.g., N) can be determined from a look-up table based on a channel indicated by the applications processor 602.

Synthesizer circuitry 606D of the RF circuitry 606 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 606D can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 606 can include an IQ/polar converter.

FEM circuitry 608 can include a receive signal path which can include circuitry configured to operate on RF signals received from one or more antennas 610, amplify the received signals and provide the amplified versions of the received signals to the RF circuitry 606 for further processing. FEM circuitry 608 can also include a transmit signal path which can include circuitry configured to amplify signals for transmission provided by the RF circuitry 606 for transmission by one or more of the one or more antennas 610. In various aspects, the amplification through the transmit or receive signal paths can be done solely in the RF circuitry 606, solely in the FEM 608, or in both the RF circuitry 606 and the FEM 608.

In some aspects, the FEM circuitry 608 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 606). The transmit signal path of the FEM circuitry 608 can include a power amplifier (PA) to amplify input RF signals (e.g., provided by RF circuitry 606), and one or more filters to generate RF signals for subsequent transmission (e.g., by one or more of the one or more antennas 610).

In some aspects, the PMC 612 can manage power provided to the baseband circuitry 604. In particular, the PMC 612 can control power-source selection, voltage scaling, battery charging, or DC-to-DC conversion. The PMC 612 can often be included when the device 600 is capable of being powered by a battery, for example, when the device is included in a UE. The PMC 612 can increase the power conversion efficiency while providing desirable implementation size and heat dissipation characteristics.

While FIG. 6 shows the PMC 612 coupled only with the baseband circuitry 604. However, in other aspects, the PMC 612 may be additionally or alternatively coupled with, and perform similar power management operations for, other components such as, but not limited to, application circuitry 602, RF circuitry 606, or FEM 608.

In some aspects, the PMC 612 can control, or otherwise be part of, various power saving mechanisms of the device 600. For example, if the device 600 is in an RRC_Connected state, where it is still connected to the RAN node as it expects to receive traffic shortly, then it can enter a state known as Discontinuous Reception Mode (DRX) after a period of inactivity. During this state, the device 600 can power down for brief intervals of time and thus save power.

If there is no data traffic activity for an extended period of time, then the device 600 can transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 602 and processors of the baseband circuitry 604 can be used to execute elements of one or more instances of a protocol stack. For example, processors of the baseband circuitry 604, alone or in combination, can be used execute Layer 3, Layer 2, or Layer 1 functionality, while processors of the application circuitry 604 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node.

In regard to the various functions performed by the above described components, machines, devices, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as electronic hardware configured to implement the functions, or a computer-readable medium having computer-executable instructions for performing the acts or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present disclosure.

The following examples pertain to further embodiments.

Example 1 is a method of facilitating update of software for an outdoor power equipment, comprising: transmitting associated version information for each microcontroller unit (MCU) of a set of MCUs of the outdoor power equipment; receiving a first request to enter a system update state; initiating the system update state in response to the first request; receiving an update binary for one or more MCUs of the set of MCUs; verifying the integrity of the update binary; receiving a second request to begin update of the one or more MCUs based on the update binary; and updating the one or more MCUs with the update binary based on the received second request.

Example 2 comprises the subject matter of any variation of example(s) 1, wherein the outdoor power equipment comprises a Vehicle Control Module (VCM), and wherein updating the one or more MCUs comprises utilizing a bootloader to program application software of the one or more MCUs from the VCM based on the update binary.

Example 3 comprises the subject matter of any variation of example(s) 2, wherein the set of MCUs comprises a first MCU within the VCM, wherein the first MCU is configured to communicate with each other MCU of the set of MCUs over one of a Controller Area Network (CAN), a Flexible Data-Rate CAN (FDCAN), a safety FDCAN, a non-safety FDCAN, or a non-CAN communication protocol.

Example 4 comprises the subject matter of any variation of example(s) 3, wherein the one or more MCUs comprises the first MCU, wherein updating the one or more MCUs further comprises, prior to utilizing the bootloader: storing the update binary in a first flash memory external to the first MCU; loading the bootloader from the first MCU into a random-access memory (RAM) of the first MCU; and transferring the update binary from the first flash memory to a second flash memory internal to the first MCU.

Example 5 comprises the subject matter of any variation of example(s) 3-4, wherein the one or more MCUs comprises a display MCU, and wherein updating the one or more MCUs further comprises directly streaming updated display image assets to a memory accessible by the display MCU.

Example 6 comprises the subject matter of any variation of example(s) 1-5, further comprising, prior to updating the one or more MCUs, generating a user notification to avoid powering down the outdoor power equipment and to avoid disconnecting a wireless connection of the outdoor power equipment.

Example 7 comprises the subject matter of any variation of example(s) 3-6, wherein the one or more MCUs comprises a Vehicle Application Processor (VAPP) within the VCM, wherein the VCM is configured to communicate with the VAPP over the non-CAN communication interface, wherein the bootloader is a bootloader for the non-CAN communication interface within the VAPP, wherein the first MCU comprises an additional bootloader, and wherein updating the one or more MCUs further comprises, prior to utilizing the bootloader: converting FDCAN bootloader commands to messages for the non-CAN communication interface via the first MCU; and sending the messages for the non-CAN communication interface to the VAPP over the non-CAN communication interface, wherein utilizing the bootloader comprises utilizing the bootloader to program application software of the one or more MCUs from the VCM based on the update binary and on the messages for the non-CAN communication interface.

Example 8 comprises the subject matter of any variation of example(s) 3-7, wherein the non-CAN communication interface is one of a Universal Asynchronous Receiver-Transmitter (UART) interface, a Serial Peripheral Interface (SPI), an Ethernet interface, or an Inter-Integrated Circuit (I2C) interface.

Example 9 comprises the subject matter of any variation of example(s) 1-8, wherein the update binary comprises an entire image of a software version for the one or more MCUs.

Example 10 comprises the subject matter of any variation of example(s) 1-9, wherein the update binary comprises a portion of a software version for the one or more MCUs that is different than a current software version for the one or more MCUs, wherein the associated version information for the one or more MCUs indicates the current software version for the one or more MCUs.

Example 11 comprises the subject matter of any variation of example(s) 1-10, wherein transmitting the associated version information, receiving the first request, receiving the update binary, and receiving the second request occur via a wireless communication interface, wherein the wireless communication interface is one of a cellular interface, a WiFi interface, or a Bluetooth interface.

Example 12 is a method of facilitating update of software for an outdoor power equipment, comprising: receiving associated version information for each microcontroller unit (MCU) of a set of MCUs of the outdoor power equipment; determining one or more MCUs of the set of MCUs to update; transmitting a first request for the outdoor power equipment to enter a system update state; transmitting an update binary for the one or more MCUs of the set of MCUs; and transmitting a second request to begin update of the one or more MCUs based on the update binary.

Example 13 comprises the subject matter of any variation of any of example(s) 12, wherein the one or more MCUs comprises a display MCU, and wherein the method further comprises directly streaming updated display image assets to a memory accessible by the display MCU.

Example 14 comprises the subject matter of any variation of any of example(s) 12-13, further comprising computing a binary delta between a new software version for the one or more MCUs and a current software version for the one or more MCUs, wherein the associated version information for the one or more MCUs indicates the current software version for the one or more MCUs, and wherein the update binary is generated based at least in part on the binary delta.

Example 15 comprises the subject matter of any variation of any of example(s) 14, wherein the update binary comprises an entire image of the new software version for the one or more MCUs, based on a determination that the binary delta exceeds a threshold percentage of the new software version.

Example 16 comprises the subject matter of any variation of any of example(s) 14, wherein the update binary comprises a portion of the new software version corresponding to the binary delta.

Example 17 comprises the subject matter of any variation of any of example(s) 12, wherein receiving the associated version information, transmitting the first request, transmitting the update binary, and receiving the second request occur via a wireless communication interface, wherein the wireless communication interface is one of a cellular interface, a WiFi interface, or a Bluetooth interface.

Example 18 is a system that facilitates update of software for an outdoor power equipment, comprising: a memory configured to store instructions; and one or more processors configured to execute the instructions to: transmit associated version information for each microcontroller unit (MCU) of a set of MCUs of the outdoor power equipment; receive a first request to enter a system update state; initiate the system update state in response to the first request; receive an update binary for one or more MCUs of the set of MCUs; verify the integrity of the update binary; receive a second request to begin update of the one or more MCUs based on the update binary; and update the one or more MCUs with the update binary based on the received second request.

Example 19 comprises the subject matter of any variation of any of example(s) 18, wherein the outdoor power equipment comprises a Vehicle Control Module (VCM), and wherein updating the one or more MCUs comprises utilizing a bootloader to program application software of the one or more MCUs from the VCM based on the update binary.

Example 20 comprises the subject matter of any variation of any of example(s) 19, wherein the set of MCUs comprises a first MCU within the VCM, wherein the first MCU is configured to communicate with each other MCU of the set of MCUs over one of a Controller Area Network (CAN), a Flexible Data-Rate CAN (FD-CAN), a safety FDCAN, a non-safety FDCAN, or a non-CAN communication protocol.

Example 21 comprises the subject matter of any variation of any of example(s) 20, wherein the one or more MCUs comprises the first MCU, wherein updating the one or more MCUs further comprises, prior to utilizing the bootloader: storing the update binary in a first flash memory external to the first MCU; loading the bootloader from the first MCU into a random-access memory (RAM) of the first MCU; and transferring the update binary from the first flash memory to a second flash memory internal to the first MCU.

Example 22 comprises the subject matter of any variation of any of example(s) 20-21, wherein the one or more MCUs comprises a display MCU, and wherein updating the one or more MCUs further comprises directly streaming updated display image assets to a memory accessible by the display MCU.

Example 23 comprises the subject matter of any variation of any of example(s) 22, wherein the one or more processors are further configured to execute the instructions to, prior to update the one or more MCUs, generate a user notification to avoid powering down the outdoor power equipment and to avoid disconnecting a wireless connection of the outdoor power equipment.

Example 24 comprises the subject matter of any variation of any of example(s) 20-23, wherein the one or more MCUs comprise a Vehicle Application Processor (VAPP) within the VCM, wherein the VCM is configured to communicate with the VAPP over the non-CAN communication interface, wherein the bootloader is a bootloader for the non-CAN communication interface within the VAPP, wherein the first MCU comprises an additional bootloader, and wherein updating the one or more MCUs further comprises, prior to utilizing the bootloader: converting FDCAN bootloader commands to messages for the non-CAN communication interface via the first MCU; and sending the messages for the non-CAN communication interface to the VAPP over the non-CAN communication interface, wherein utilizing the bootloader comprises utilizing the bootloader to program application software of the one or more MCUs from the VCM based on the update binary and on the messages for the non-CAN communication interface.

Example 25 comprises the subject matter of any variation of any of example(s) 20-24, wherein the non-CAN communication interface is one of a Universal Asynchronous Receiver-Transmitter (UART) interface, a Serial Peripheral Interface (SPI), an Ethernet interface, or an Inter-Integrated Circuit (I2C) interface.

Example 26 comprises the subject matter of any variation of any of example(s) 18-25, wherein the update binary comprises an entire image of a software version for the one or more MCUs.

Example 27 comprises the subject matter of any variation of any of example(s) 18-25, wherein the update binary comprises a portion of a software version for the one or more MCUs that is different than a current software version for the one or more MCUs, wherein the associated version information for the one or more MCUs indicates the current software version for the one or more MCUs.

Example 28 comprises the subject matter of any variation of any of example(s) 18-27, wherein transmitting the associated version information, receiving the first request, receiving the update binary, and receiving the second request occur via a wireless communication interface, wherein the wireless communication interface is one of a cellular interface, a WiFi interface, or a Bluetooth interface.

Example 29 is a system that facilitates update of software for an outdoor power equipment, comprising: a memory configured to store instructions; and one or more processors configured to execute the instructions to: receive associated version information for each microcontroller unit (MCU) of a set of MCUs of the outdoor power equipment; determine one or more MCUs of the set of MCUs to update; transmit a first request for the outdoor power equipment to enter a system update state; transmit an update binary for the one or more MCUs of the set of MCUs; and transmit a second request to begin update of the one or more MCUs based on the update binary.

Example 30 comprises the subject matter of any variation of any of example(s) 29, wherein the one or more MCUs comprises a display MCU, and wherein the method further comprises directly streaming updated display image assets to a memory accessible by the display MCU.

Example 31 comprises the subject matter of any variation of any of example(s) 29-30, wherein the one or more processors are further configured to execute the instructions to compute a binary delta between a new software version for the one or more MCUs and a current software version for the one or more MCUs, wherein the associated version information for the one or more MCUs indicates the current software version for the one or more MCUs, and wherein the update binary is generated based at least in part on the binary delta.

Example 32 comprises the subject matter of any variation of any of example(s) 29-31, wherein the update binary comprises an entire image of the new software version for the one or more MCUs, based on a determination that the binary delta exceeds a threshold percentage of the new software version.

Example 33 comprises the subject matter of any variation of any of example(s) 29-31, wherein the update binary comprises a portion of the new software version corresponding to the binary delta.

Example 34 comprises the subject matter of any variation of any of example(s) 29-33, wherein receiving the associated version information, transmitting the first request, transmitting the update binary, and receiving the second request occur via a wireless communication interface, wherein the wireless communication interface is one of a cellular interface, a WiFi interface, or a Bluetooth interface.

Example 35 is a machine-readable medium comprising instructions, wherein the instructions, when executed, cause a machine to perform the method of any variation of any of example(s) 1-17.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of facilitating update of software for an outdoor power equipment, comprising:

transmitting associated version information for each microcontroller unit (MCU) of a set of MCUs of the outdoor power equipment;

receiving a first request to enter a system update state;

initiating the system update state in response to the first request;

receiving an update binary for one or more MCUs of the set of MCUs;

verifying the integrity of the update binary;

receiving a second request to begin update of the one or more MCUs based on the update binary; and updating the one or more MCUs with the update binary based on the received second request; wherein:

the outdoor power equipment comprises a Vehicle Control Module (VCM), and wherein updating the one or more MCUs comprises utilizing a bootloader to program application software of the one or more MCUs from the VCM based on the update binary, wherein the set of MCUs comprises a first MCU within the VCM, wherein the first MCU is configured to communicate with each other MCU of the set of MCUs over one of a Controller Area Network (CAN), a Flexible Data-Rate CAN (FDCAN), a safety FDCAN, a non-safety FDCAN, or a non-CAN communication protocol, and the one or more MCUs comprises a Vehicle Application Processor (VAPP) within the VCM, wherein the VCM is configured to communicate with the VAPP over the non-CAN communication interface, wherein the bootloader is a bootloader for the non-CAN communication interface within the VAPP, wherein the first MCU comprises an additional bootloader, and further wherein updating the one or more MCUs further comprises, prior to utilizing the bootloader:

converting FDCAN bootloader commands to messages for the non-CAN communication interface via the first MCU; and sending the messages for the non-CAN communication interface to the VAPP over the non-CAN communication interface, wherein utilizing the bootloader comprises utilizing the bootloader to program application software of the one or more MCUs from the VCM based on the update binary and on the messages for the non-CAN communication interface.

2. The method of claim 1, wherein the one or more MCUs comprises the first MCU, wherein updating the one or more MCUs further comprises, prior to utilizing the bootloader:

storing the update binary in a first flash memory external to the first MCU;

loading the bootloader from the first MCU into a random-access memory (RAM) of the first MCU; and transferring the update binary from the first flash memory to a second flash memory internal to the first MCU.

3. The method of claim 1, wherein the one or more MCUs comprises a display MCU, and wherein updating the one or more MCUs further comprises directly streaming updated display image assets to a memory accessible by the display MCU.

4. The method of claim 3, further comprising, prior to updating the one or more MCUs, generating a user notification to avoid powering down the outdoor power equipment and to avoid disconnecting a wireless connection of the outdoor power equipment.

5. The method of claim 1, wherein the non-CAN communication interface is one of a Universal Asynchronous Receiver-Transmitter (UART) interface, a Serial Peripheral Interface (SPI), an Ethernet interface, or an Inter-Integrated Circuit (I2C) interface.

6. The method of claim 1, wherein the update binary comprises an entire image of a software version for the one or more MCUs.

7. The method of claim 1, wherein the update binary comprises a portion of a software version for the one or more MCUs that is different than a current software version for the one or more MCUs, wherein the associated version information for the one or more MCUs indicates the current software version for the one or more MCUs.

8. The method of claim 1, wherein transmitting the associated version information, receiving the first request, receiving the update binary, and receiving the second request occur via a wireless communication interface, wherein the wireless communication interface is one of a cellular interface, a WiFi interface, or a Bluetooth interface.

9. A system that facilitates update of software for an outdoor power equipment, comprising:

a memory configured to store instructions; and one or more processors configured to execute the instructions to:

transmit associated version information for each microcontroller unit (MCU) of a set of MCUs of the outdoor power equipment;

receive a first request to enter a system update state;

initiate the system update state in response to the first request;

receive an update binary for one or more MCUs less than the plurality of the set of MCUs;

verify the integrity of the update binary;

receive a second request to begin update of the one or more MCUs based on the update binary; and update the one or more MCUs with the update binary based on the received second request, wherein:

the outdoor power equipment comprises a Vehicle Control Module (VCM), and wherein updating the one or more MCUs comprises utilizing a bootloader to program application software of the one or more MCUs from the VCM based on the update binary, the set of MCUs comprises a first MCU within the VCM, wherein the first MCU is configured to communicate with each other MCU of the set of MCUs over one of a Controller Area Network (CAN), a Flexible Data-Rate CAN (FDCAN), a safety FDCAN, a non-safety FDCAN, or a non-CAN communication protocol, and the one or more MCUs comprise a Vehicle Application Processor (VAPP) within the VCM, wherein the VCM is configured to communicate with the VAPP over the non-CAN communication interface, wherein the bootloader is a bootloader for the non-CAN communication interface within the VAPP, and wherein the first MCU comprises an additional bootloader, and wherein updating the one or more MCUs further comprises, prior to utilizing the bootloader:

converting FDCAN bootloader commands to messages for the non-CAN communication interface via the first MCU; and sending the messages for the non-CAN communication interface to the VAPP over the non-CAN communication interface, wherein utilizing the bootloader comprises utilizing the bootloader to program application software of the one or more MCUs from the VCM based on the update binary and on the messages for the non-CAN communication interface.

10. The system of claim 9, wherein the one or more MCUs comprises the first MCU, wherein updating the one or more MCUs further comprises, prior to utilizing the bootloader:

storing the update binary in a first flash memory external to the first MCU;

loading the bootloader from the first MCU into a random-access memory (RAM) of the first MCU; and transferring the update binary from the first flash memory to a second flash memory internal to the first MCU.

11. The system of claim 9, wherein the one or more MCUs comprises a display MCU, and wherein updating the one or more MCUs further comprises directly streaming updated display image assets to a memory accessible by the display MCU.

12. The system of claim 11, wherein the one or more processors are further configured to execute the instructions to, prior to update the one or more MCUs, generate a user notification to avoid powering down the outdoor power equipment and to avoid disconnecting a wireless connection of the outdoor power equipment.

13. The system of claim 9, wherein the non-CAN communication interface is one of a Universal Asynchronous Receiver-Transmitter (UART) interface, a Serial Peripheral Interface (SPI), an Ethernet interface, or an Inter-Integrated Circuit (I2C) interface.

14. The system of claim 9, wherein the update binary comprises an entire image of a software version for the one or more MCUs.

15. The system of claim 9, wherein the update binary comprises a portion of a software version for the one or more MCUs that is different than a current software version for the one or more MCUs, wherein the associated version information for the one or more MCUs indicates the current software version for the one or more MCUs.

16. The system of claim 9, wherein transmitting the associated version information, receiving the first request, receiving the update binary, and receiving the second request occur via a wireless communication interface, wherein the wireless communication interface is one of a cellular interface, a WiFi interface, or a Bluetooth interface.

* * * * *